United States Patent
Yao et al.

(10) Patent No.: US 11,673,541 B2
(45) Date of Patent: Jun. 13, 2023

(54) METHOD FOR CONTROLLING A HYDRAULIC BRAKE SYSTEM, AND A CORRESPONDING DEVICE

(71) Applicant: Robert Bosch GmbH, Stuttgart (DE)

(72) Inventors: Xun Yao, Beilstein (DE); Achim Eisele, Hessigheim (DE); Benjamin Heinz, Eberstadt (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 16/668,233

(22) Filed: Oct. 30, 2019

(65) Prior Publication Data
US 2020/0189547 A1 Jun. 18, 2020

(30) Foreign Application Priority Data
Dec. 18, 2018 (DE) .................. 10 2018 222 164.2

(51) Int. Cl.
| | | |
|---|---|---|
| *B60T 13/68* | (2006.01) | |
| *B60T 8/176* | (2006.01) | |
| *B60T 8/1763* | (2006.01) | |
| *B60T 8/1755* | (2006.01) | |

(52) U.S. Cl.
CPC ........... *B60T 13/686* (2013.01); *B60T 8/176* (2013.01); *B60T 8/17551* (2013.01); *B60T 8/17636* (2013.01); *B60T 2210/12* (2013.01); *B60T 2210/30* (2013.01); *B60T 2270/10* (2013.01); *B60T 2270/30* (2013.01)

(58) Field of Classification Search
CPC .... B60T 13/686; B60T 8/17551; B60T 8/176; B60T 8/17636; B60T 2210/12; B60T 2210/30; B60T 2270/10; B60T 2270/30; B60T 8/4081; B60T 8/4059; B60T 8/4275; B60T 7/042
USPC ...................................... 303/119.1
See application file for complete search history.

(56) References Cited

U.S. PATENT DOCUMENTS

| | | | | |
|---|---|---|---|---|
| 4,753,493 A | * | 6/1988 | Arikawa | B60T 8/94 303/113.1 |
| 5,820,229 A | * | 10/1998 | Pueschel | B60T 8/175 303/113.2 |
| 2003/0098613 A1 | * | 5/2003 | Bohm | B60T 8/4081 303/166 |
| 2011/0089756 A1 | * | 4/2011 | Hirose | B60T 8/3655 303/119.1 |
| 2011/0121641 A1 | * | 5/2011 | Masuda | B60T 8/4872 303/10 |

(Continued)

FOREIGN PATENT DOCUMENTS

CN 104169142 A 11/2014

*Primary Examiner* — Robert A. Siconolfi
*Assistant Examiner* — San M Aung
(74) *Attorney, Agent, or Firm* — Maginot, Moore & Beck LLP (57) ABSTRACT

A method for controlling a hydraulic brake system for a motor vehicle to carry out a braking operation by means of at least one wheel brake includes, in a first step, a pressure buildup in the wheel brake, wherein hydraulic fluid is passed to a wheel brake via a normally open inlet valve. In a second step, a pressure reduction takes place in the wheel brake, wherein hydraulic fluid is discharged from the wheel brake via an energized normally closed outlet valve. The pressure reduction at the wheel brake is accomplished by means of control of the outlet valve in a predefined manner.

13 Claims, 4 Drawing Sheets

(56) References Cited

U.S. PATENT DOCUMENTS

| | | | |
|---|---|---|---|
| 2013/0292999 A1* | 11/2013 | Strengert | B60T 8/268 |
| | | | 303/10 |
| 2014/0142825 A1* | 5/2014 | Harada | B60T 7/122 |
| | | | 701/70 |
| 2015/0021978 A1* | 1/2015 | Feigel | B60T 8/3655 |
| | | | 303/15 |

* cited by examiner

METHOD FOR CONTROLLING A HYDRAULIC BRAKE SYSTEM, AND A CORRESPONDING DEVICE

This application claims priority under 35 U.S.C. § 119 to application no. DE 10 2018 222 164.2, filed on Dec. 18, 2018 in Germany, the disclosure of which is incorporated herein by reference in its entirety.

The present disclosure relates to a method for controlling a hydraulic brake system for a motor vehicle for carrying out a braking operation by means of at least one wheel brake, wherein, in a first step, a pressure buildup takes place in the wheel brake, wherein hydraulic fluid is passed to a wheel brake via a normally open inlet valve and, in a second step, a pressure reduction takes place in the wheel brake, wherein hydraulic fluid is discharged from the wheel brake via an energized normally closed outlet valve. The method is characterized in that the pressure reduction at the wheel brake is accomplished by means of control of the outlet valve in a predefined manner. The disclosure furthermore relates to a device for carrying out the method.

BACKGROUND

ABS braking methods are widely described in the prior art. By means of such methods, the intention is to prevent the wheel locking up in such a way on a surface underlying the vehicle that the slip of the wheel rises above a certain value, beyond which the tendency for locking up occurs. By this means, the intention is, on the one hand, to prevent the wheel from entering (too far) into the range of sliding friction and, on the other hand, the vehicle should continue to remain controllable. The latter is not the case when the locking wheel is used to steer the vehicle because, in this case, it is not possible to transfer cornering forces to the underlying surface. In the case of the braking process of the vehicle, which is initiated by a driver of the vehicle or by a driver assistance system, for example, the braking force variable set at the braking device should therefore be increased until the tendency for locking up is detected. In this context, the tendency for locking up is present when the slip of the wheel exceeds a certain limiting value. For this purpose, the wheel can be assigned means for determining its rotational speed, and this can be compared with a reference speed of the vehicle or a reference rotational speed. After the tendency for locking up has been detected, the braking force variable is reduced to the determined or predetermined value. This is equal to zero, for example, or corresponds to a braking force variable at which the tendency for locking up is no longer present or detected.

At present, switchable outlet valves (AV) are used to reduce pressure in order to bring the wheel back from the unstable range of the μ-slip curve to the stable range during an ABS control operation. However, the use of switching valves does not enable the desired reduction gradient to be influenced directly during the opening phase. The pressure reduction gradient is obtained indirectly, while an outlet valve is open, through the throttling of the valve, the stiffness of the wheel brake and the backpressure (e.g. in the storage chamber in closed systems). A suitable reduction gradient for the ABS controller must therefore be adapted by way of the AV throttling for the vehicle brake and represents a compromise between the various operating points in the pressure/volume characteristic (stiffness characteristic) of the wheel brake.

SUMMARY

In contrast, the method according to the disclosure advantageously allows an optimized braking performance with cost-optimized components and an improvement in the NVH behavior.

The method according to the disclosure for controlling a hydraulic brake system for a motor vehicle for carrying out a braking operation by means of at least one wheel brake, wherein, in a first step, a pressure buildup takes place in the wheel brake, wherein hydraulic fluid is passed to a wheel brake via a normally open inlet valve and, in a second step, a pressure reduction takes place in the wheel brake, wherein hydraulic fluid is discharged from the wheel brake via an energized normally closed outlet valve, is characterized in that the pressure reduction at the wheel brake is accomplished by means of control of the outlet valve in a predefined manner.

This is understood to mean that a defined pressure reduction is set at the wheel brake by means of control of the outlet valve. By means of the control of the controllable outlet valves, it is possible to set an optimum reduction gradient for each operating point (wheel pressure) and underlying roadway surface, for example. It is thereby possible to achieve a reduction in volume consumption caused by the cyclic pressure buildup and reduction.

The braking operation described is, in particular, an ABS braking operation. Here, the pressure reduction at the wheel brake can be set. In particular, such setting is performed by the vehicle constructor. That is to say that the pressure reduction takes place in accordance with a predetermined profile or function, e.g. in accordance with a defined pressure reduction gradient. The pressure reduction can furthermore be performed in a variable manner. For example, different pressure reduction profiles can be selected for different boundary conditions, and the pressure reduction at the wheel brake can take place in accordance with the respective pressure reduction profile.

The method can thus comprise a general control strategy or a plurality of control strategies for different situations. The following situations and control possibilities may be described, for example:

In the case of an ABS maneuver, the maximum of the μ-slip curve should be overridden in a low-frequency manner. A controlled pressure reduction allows good monitoring of the wheel. As a result, the wheel can be held in the vicinity of the μ maximum for longer. The frequency of the ABS control and the volume consumption are thereby significantly reduced.

On underlying surfaces with a μ-slip curve in which the friction coefficient μ continues to rise or falls only slowly, even with a high slip (particularly in the case of a loose underlying surface, e.g. in the case of sand, in some cases snow, gravel, broken surface, etc.), selective reduction of the reduction gradient can be performed. Good monitoring of the wheel is thereby possible. An optimization, thereby made possible, of the reduction variable during a "high-slip control operation" brings an improvement in braking performance while simultaneously reducing volume consumption.

During control in the stable range of the μ-slip curve— e.g. in the case of partial braking—the pressure is always reduced in a controlled manner. It is thereby advantageously achieved that the pressure reduction is not perceptible to the driver. This allows an improvement in ride comfort.

The advantages of such a control strategy lie in different areas. These are, for example, reducing the brake system costs. In comparison with the current brake system, the volume consumption is significantly reduced by a control strategy of this kind. This allows the use of a less powerful pump motor for the ABS brake system. Moreover, it is thereby possible to achieve a lower weight and volume in comparison with current ABS systems. Moreover, advantages are obtained in respect of noise and vibration behavior (NVH) by virtue of less noise in the case of a controlled pressure reduction, especially in the case of partial braking functions. Moreover, such control has the effect of reducing stress on the components since the hardware components are subject to less stress by virtue of the reduced volume consumption. This leads to a longer life. Alternatively, the design of the components can be adapted accordingly. Another significant advantage, of course, is the improved braking performance on snow, sand, gravel and underlying surfaces with a similar μ-slip characteristic.

In an advantageous embodiment, the method is characterized in that the braking force or the brake pressure or the brake slip is used as the controlled variable.

This is understood to mean that the hydraulic brake system for the motor vehicle is configured as an ABS brake system. It therefore generally has an ABS control device, which can be embodied as a controller. The braking force variable can be directly the set braking force or, alternatively, a brake pressure, a brake slip or the like, for example.

In one possible embodiment, the method is characterized in that the control of the outlet valve is configured as an instability controller.

This is understood to mean that there is in the brake system a correspondingly configured controller which operates on the optimizer principle. Such controllers are also referred to as instability controllers. These set the braking force variable acting on the wheel in such a way that the above-described sequence comprising increasing the braking force variable until the tendency for locking up is detected and reducing it to the determined value is achieved. During this process, the maximum of a μ-slip curve is overridden cyclically, and the braking force variable of the wheel is thus moved closer to a maximum. Here, the μ-slip curve is a curve which describes the variation of the friction coefficient μ against the slip of the wheel. The μ-slip curve is dependent both on the wheel and on the surface underlying the vehicle as well as on ambient conditions (temperature, humidity etc.). These factors can be taken into account during control in order to achieve an improved quality of result.

In a preferred embodiment, the method is characterized in that a pressure reduction in accordance with a defined pressure curve is performed by means of the control of the outlet valve.

This is understood to mean that the pressure reduction is performed in a manner such that it corresponds substantially to a defined pressure curve. A pressure variation over time can be used as the pressure curve, for example. A pressure curve of this kind shows, for example, the ideal variation of the hydraulic pressure (e.g. pressure reduction) of a wheel brake in the case of specific parameters in order to achieve optimum braking performance. A pressure curve of this kind can be stored in a memory of the vehicle. Of course, different pressure curves, e.g. for different applications, are also conceivable. Here, the control of the outlet valve is performed in a manner such that the actually present pressure in the wheel brake is set in accordance with the relevant pressure profile (i.e. relieved). Simple linear and complex functions can be used as a pressure reduction profile.

In an alternative development, the method is characterized in that a continuous pressure reduction is performed at the wheel brake by means of the control of the outlet valve.

This is understood to mean that the pressure reduction is controlled in such a way that, from a first pressure at a first time, a second pressure is achieved at a second time, wherein the pressure reduction between these two points takes place continuously. In a specific embodiment, this pressure reduction can even take place in a linear manner between the two defined times.

In an advantageous embodiment, the method is characterized in that low-frequency overriding of the maximum of the μ-slip curve is performed by means of the control of the outlet valve, especially in the case of an ABS maneuver.

The following control strategy can furthermore be carried out with the aid of controllable outlet valves. By means of the controllable outlet valves, the pressure is reduced in a controlled manner in the case of an ABS maneuver. The controlled pressure reduction makes it possible to monitor the wheel in more detail during the pressure reduction. In this case, the wheel can be held for longer in the vicinity of the μ maximum of the μ-slip curve. It is thereby possible to reduce the frequency of the pressure buildup and reduction, leading to a reduction in the volume consumption. This allows the use of a less powerful motor, allowing a cost advantage in the design of the system.

In the method, the proposal is to achieve low-frequency overriding of the maximum of the μ-slip curve by controlled pressure reduction in order to ensure that the volume consumption in the case of ABS control is reduced. A control strategy of this kind is illustrated by way of example in FIG. 2b.

In one possible embodiment, the method is characterized in that the control of the outlet valve takes account of an existing hydraulic pressure in the wheel brake.

This is understood to mean that the pressure reduction is varied as a function of the hydraulic pressure of the brake system. In this case, the pressure curve is, for example, a function of the currently applied hydraulic pressure at the respective wheel brake.

In a preferred development, the method is characterized in that the control of the outlet valve takes account of at least one feature of the roadway, in particular a friction coefficient of the roadway.

This is understood to mean that the pressure reduction is varied as a function of the characteristic of the roadway. In this case, it is, in particular, the friction coefficient of the roadway which is taken into account. The pressure curve is therefore a function of the existing wheel brake pressure and of the roadway friction coefficient, for example.

In an alternative embodiment, the method is characterized in that the control of the outlet valve takes account of at least one ambient condition, in particular an ambient temperature or humidity.

This is understood to mean that the pressure reduction is varied as a function of the characteristic of the environment. The pressure curve is thus selected or set in accordance with the existing ambient temperature.

This method can be implemented, for example, in software or hardware or in a hybrid form comprising software and hardware, e.g. in a control unit.

The approach presented here furthermore provides a device which is designed to carry out, control or implement the steps of a variant of a method presented here in corresponding devices. By means of this variant embodiment of the disclosure in the form of a device too, the object underlying the disclosure can be achieved rapidly and efficiently.

In the present case, a device can be understood to mean an electric device which processes sensor signals and outputs control and/or data signals in accordance therewith. The device can have an interface, which can be embodied in the form of hardware and/or software. In the case of an embodiment in the form of hardware, the interfaces can be part of a "system ASIC", for example, which contains a very wide variety of functions of the device. However, it is also possible for the interfaces to be dedicated integrated circuits or to consist at least partially of discrete component elements. In the case of an embodiment in the form of software, the interfaces can be software modules, which are present on a microcontroller in addition to other software modules, for example. A correspondingly configured controllable valve should also be understood as a device. A correspondingly set up hydraulic brake system should furthermore also be understood as a device.

Also advantageous is a computer program product or computer program with program code, which can be stored on a machine-readable carrier or storage medium, such as a semiconductor memory, a hard disk memory or an optical memory and is used to carry out, implement and/or control the steps of the method according to one of the above-described embodiments, especially if the program product or program is carried out on a computer or a device.

BRIEF DESCRIPTION OF THE DRAWINGS

It should be noted that the features presented individually in the description can be combined with one another in any technically feasible manner and give rise to further embodiments of the disclosure. Further features and the expediency of the disclosure will become apparent from the description of illustrative embodiments with reference to the appended figures.

Of the figures.

DETAILED DESCRIPTION

Figure 1:
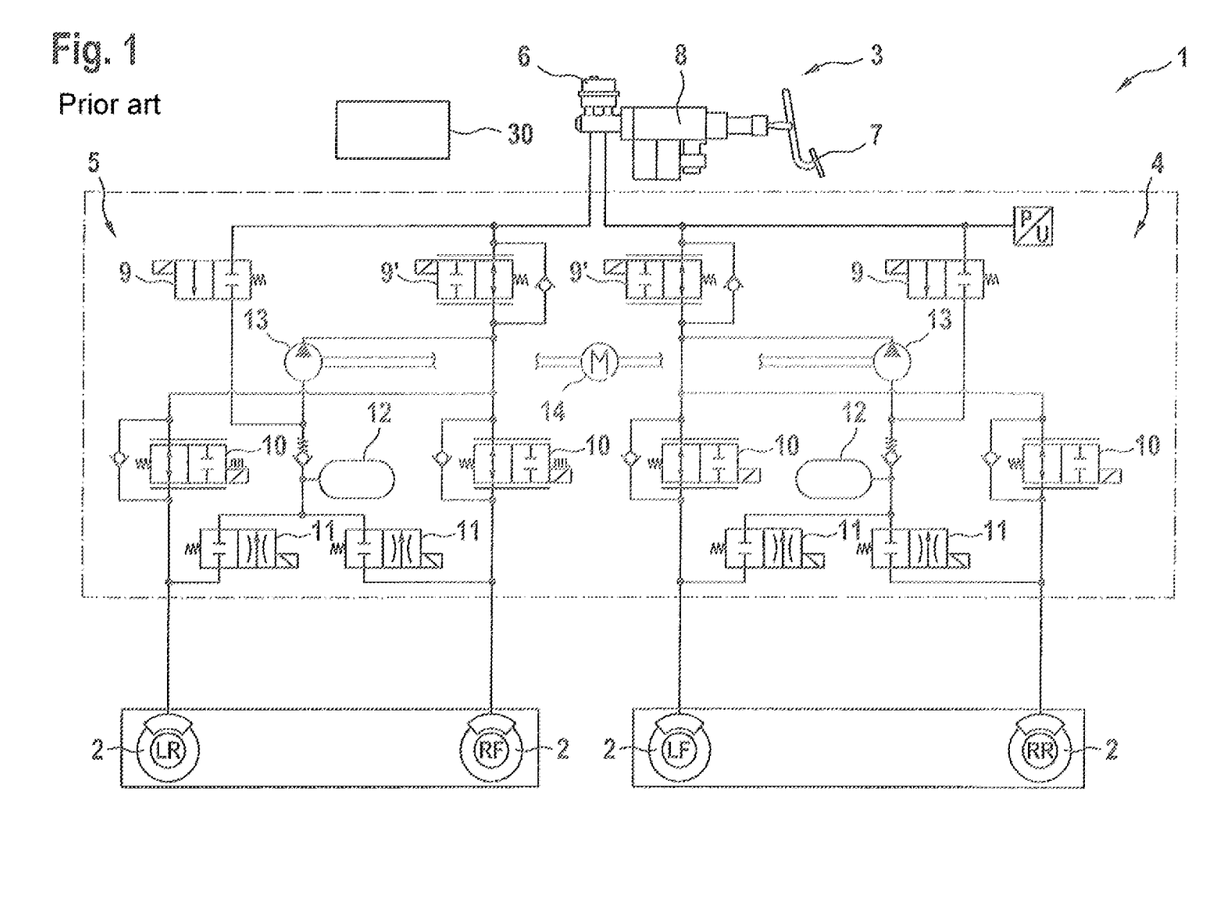
FIG. 1 shows a brake system of a motor vehicle in a simplified illustration.

FIG. 1 shows a brake system 1 for a motor vehicle (not illustrated specifically here) in a simplified illustration. The brake system 1 has a plurality of wheel brakes 2, which can be actuated as service brakes by a driver of the motor vehicle by means of a brake pedal unit 3. Here, the wheel brakes 2 are denoted by LR, RF, LF and RR, thereby explaining their position or assignment on the motor vehicle, wherein LR stands for left-hand rear, RF stands for right-hand front, LF stands for left-hand front and RR stands for right-hand rear. The elements which form the ESP module are surrounded by dashed lines. This is also referred to as a hydraulic unit. In this case, two brake circuits 4 and 5 are formed, wherein brake circuit 4 is assigned to wheel brakes LF and RR and brake circuit 5 is assigned to wheel brakes LR and RF. The two brake circuits 4 and 5 are of identical construction, and therefore the construction of both brake circuits 4, 5 will be explained in greater detail below with reference to brake circuit 4.

Brake circuit 4 is first of all connected to a brake master cylinder 6 of the brake pedal unit 3, wherein the brake pedal unit 3 furthermore has a brake pedal 7, which can be actuated by the driver, and a brake booster 8. The brake booster can be actuated pneumatically or electromechanically, for example. Brake circuit 4 has a changeover valve 9' and a high-pressure switching valve 9, which are connected in parallel with one another and follow the brake master cylinder 6. The changeover valve 9' is of normally open design and allows flow of the hydraulic medium in the brake circuit, i.e. the brake fluid, in both directions. The high-pressure switching valve 9 is of normally closed design and allows a throughflow of brake fluid only in the direction of the wheel brakes 2 in deenergized state. The changeover valve 9' is furthermore connected to the two wheel brakes 2 via one inlet valve 10 in each case, which is of normally open design in both directions. The wheel brakes 2 of brake circuit 4 are furthermore each assigned an outlet valve 11, which is of normally closed design. A hydraulic pressure accumulator 12 is arranged downstream of the outlet valves 11. On the outlet side, the outlet valves 11 are furthermore connected to a suction side of a pump 13, which is connected to brake circuit 4 on the pressure side, between the changeover valve 9' and the inlet valves 10. If the two changeover valves 9' of the brake circuits 4, 5 are closed, the hydraulic pressure is trapped or maintained in the downstream section of the brake circuits 4, 5, i.e. between the changeover valves and the wheel brakes 2, even if the brake pedal 7 is released by the driver.

The pump 13 is mechanically coupled to an electric motor 14. It is envisaged that the electric motor 14 is assigned to the pumps 13 of both brake circuits 4 and 5. Alternatively, it can also be envisaged that each brake circuit 4, 5 has a dedicated electric motor 14. A control unit 30 controls both the electric motor 14 and the valves 9, 9', 10, 11.

In this case, the outlet valve 11 allows a defined pressure reduction, e.g. a delayed pressure reduction or a pressure reduction along a pressure curve.

Figure 2A:
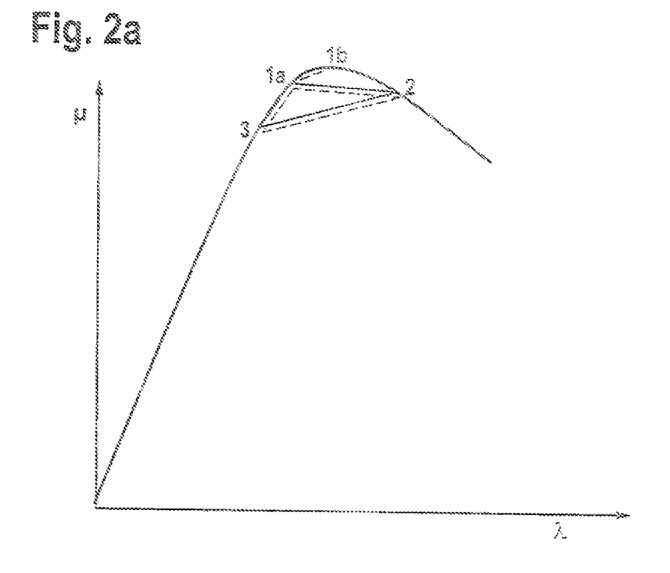
FIG. 2a shows an illustration of a μ-slip curve in the case of ABS control with and without a controlled pressure reduction.
Figure 2B:
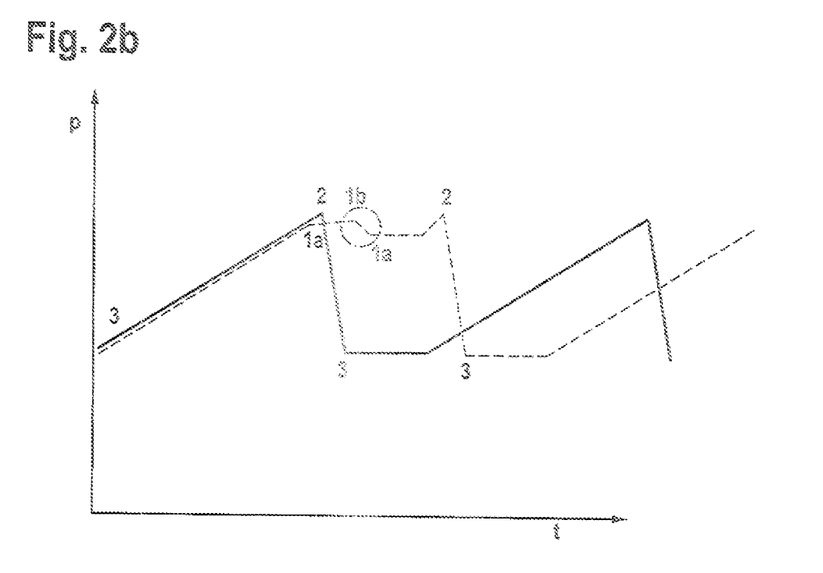
FIG. 2b shows an illustration of a pressure variation in the case of ABS control with and without a controlled pressure reduction.

An illustration of ABS control with and without a controlled pressure reduction is shown in FIG. 2. The solid lines show—both in FIG. 2 and in FIG. 3—curves according to the prior art. In contrast, the dashed lines show curves according to one possible embodiment of the control of the outlet valves in accordance with the disclosure.

In this case, FIG. 2a shows an illustration of a μ-slip curve in the case of ABS control. Here, the y axis shows the friction coefficient μ against the brake slip λ, which is illustrated on the x axis. FIG. 2b furthermore shows an illustration of a pressure variation in the case of ABS control with and without a controlled pressure reduction. Here, the y axis shows the pressure p against time t, which is illustrated on the x axis. Here, the thin solid line shows the pressure modulation from the prior art with direct overriding of the μ maximum. Here, the thin dashed line shows a pressure modulation according to one embodiment of the method with a sensitive controlled reduction just below the μ maximum.

The hydraulic wheel pressure increases in the phase between points 1a and 2 and, correspondingly, the slip of the wheel rises to a particular value, from which the wheel becomes unstable (point 2). After the detection of the tendency to lock up, the pressure is abruptly reduced at the single conventional switching valve to enable the wheel to stabilize again (point 3). This pressure reduction is illustrated by the solid line in FIG. 2b. The volume for the pressure reduction in the phase between points 2 and 3 is initially displaced into a storage chamber and then back into the brake circuit by the pump and motor. Alternatively—as described in the present disclosure—the pressure can be reduced in a controlled manner by means of a controllable outlet valve (see dashed lines). By means of a controlled pressure reduction, better monitoring of the wheel is made possible. As a result, the wheel can be held in the vicinity of the μ maximum for longer (see point 1b in FIG. 2a). An illustrative pressure variation of one embodiment of the control strategy according to the disclosure is illustrated in FIG. 2b. The dot-dashed line indicates the range in which a controlled reduction with a low reduction gradient (in comparison with reduction in the case of instability) is present. Since this pressure reduction phase occurs at a lower frequency in ABS control, the volume consumption is thus also reduced.

Figure 3A:
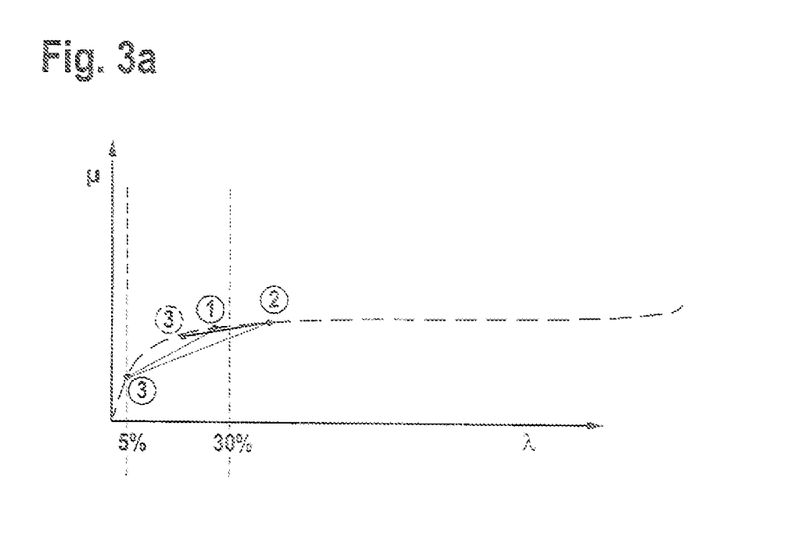
FIG. 3a shows an illustration of a μ-slip curve in the case of ABS control with and without a controlled pressure reduction on a loose underlying surface.
Figure 3B:
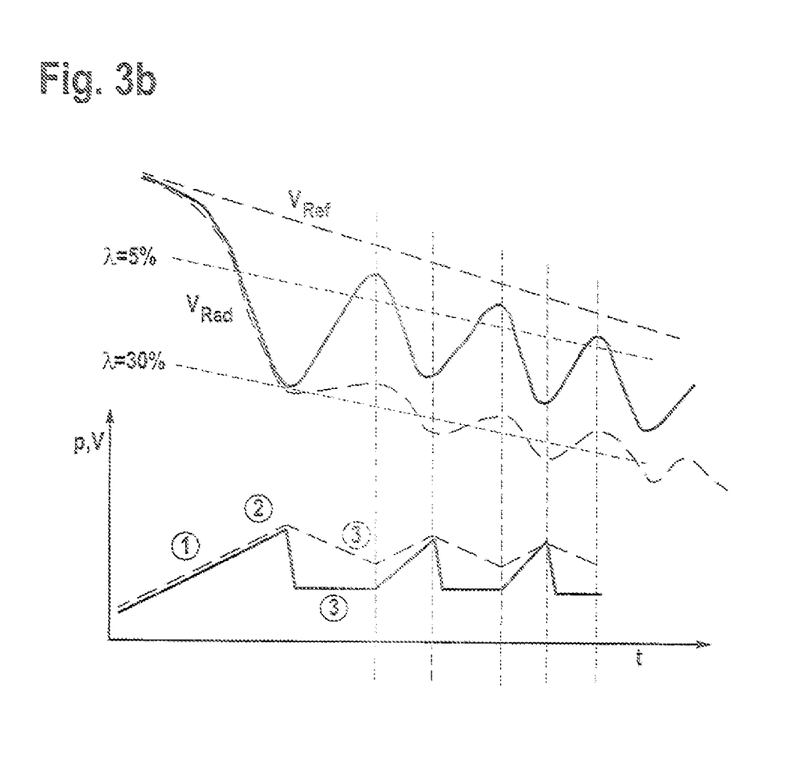
FIG. 3b shows an illustration of a pressure variation and speed variation in the case of ABS control with and without a controlled pressure reduction on a loose underlying surface.

An illustration of ABS control with and without a controlled pressure reduction is shown in a specific application in FIG. 3. This application is ABS control on a loose underlying surface, e.g. on loose snow. In addition, it is proposed likewise to employ a control strategy of this kind on underlying surfaces with a μ-slip curve in which the friction coefficient μ continues to rise or falls only slowly, even with high slip (especially loose underlying surfaces, e.g. sand, in some cases snow, gravel, broken surface, etc.) to ensure that the braking performance is improved with a simultaneous reduction in volume consumption. FIG. 3 illustrates illustrative ABS control on loose snow. It can be clearly seen here that, in the case of control with the controlled outlet valve, the pressure reduction gradient is selectively reduced, with the result that the wheel is controlled much more smoothly during ABS control. During control, the brake slip value remains in a relatively high range and, as a result, better braking performance is achieved. Here, FIG. 3a shows an illustration of a μ-slip curve in the case of ABS control with and without a controlled outlet valve. FIG. 3a once again shows the friction coefficient μ on the y axis against the brake slip λ, which is illustrated on the x axis. FIG. 3b furthermore shows an illustration of a pressure variation and a speed variation in the case of ABS control with and without a controlled pressure reduction on a loose underlying surface. In this case, the pressure p is illustrated on the y axis, against time t, which is illustrated on the x axis, in the lower illustration. In the upper illustration, the volume V is illustrated on the y axis against time t. In the case of uncontrolled reduction, the volume line decreases as far as the upper slip line, which corresponds to 5% wheel slip. The volume line of the controlled outlet valve, in contrast, shows only slight fluctuation around the lower slip line, which corresponds to 30% wheel slip.

Figure 4:
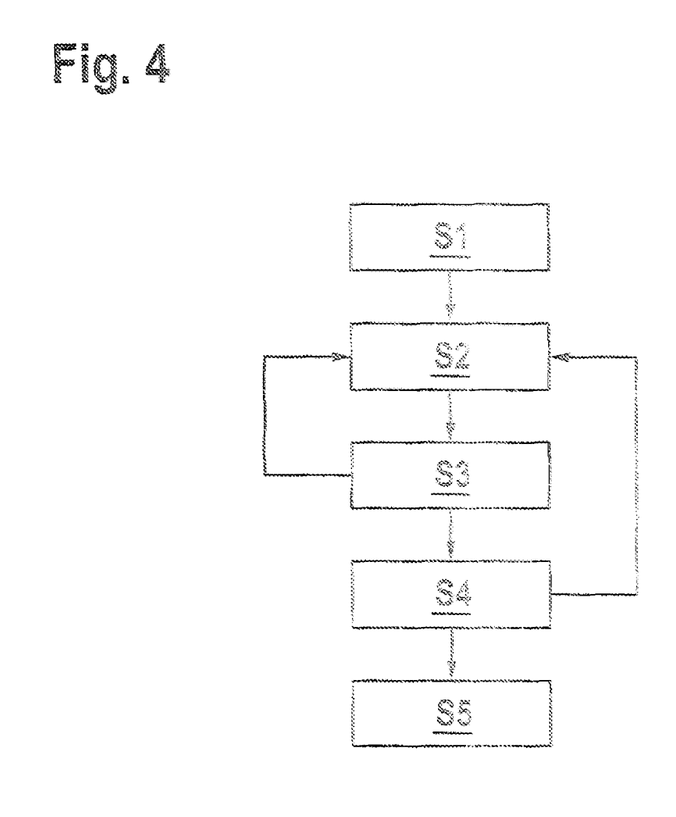
FIG. 4 shows an illustration of the method steps of an embodiment.

An illustration of the method steps of one embodiment of the disclosure is shown in FIG. 4. In this case, the start of an ABS braking operation takes place in a first step S1. In a next step S2, the braking force is increased. In a further step S3, the tendency for locking up is determined. If there is no tendency for locking up, the braking force continues to be increased in step S2. If, however, a tendency for locking up is detected, a controlled pressure reduction, e.g. a continuous pressure reduction or a pressure reduction along a defined pressure line, takes place in a step S4. After the defined reduced pressure has been achieved in the wheel brake, an increase of the braking force once again takes place by pressure buildup in step S2. Step S5 represents the end of the ABS braking operation.

The invention claimed is:

1. A method for controlling a hydraulic brake system of a motor vehicle to carry out a braking operation via at least one wheel brake, the method comprising:
building up pressure in the wheel brake by passing hydraulic fluid to the wheel brake via a normally open inlet valve; and
reducing pressure in the wheel brake by discharging hydraulic fluid from the wheel brake via an energized normally closed outlet valve, the reduction of pressure at the wheel brake accomplished by adjusting the outlet valve in a predefined manner to change a pressure reduction gradient while the pressure is being reduced in the wheel brake.

2. The method according to claim 1, wherein the adjusting of the outlet valve is based on a controlled variable, and wherein one of a braking force, a brake pressure, and a brake slip is used as the controlled variable.

3. The method according to claim 1, wherein the outlet valve is adjusted by an instability controller.

4. The method according to claim 1, wherein the adjusting of the outlet valve includes reducing the pressure in accordance with a defined pressure curve.

5. The method according to claim 1, wherein the adjusting of the outlet valve includes a continuous pressure reduction at the wheel brake.

6. The method according to claim 1, wherein the adjusting of the outlet valve includes overriding of a maximum of a μ-slip curve.

7. The method according to claim 6, wherein the overriding of the maximum of the μ-slip curve is performed during an ABS maneuver.

8. The method according to claim 1, wherein the adjusting of the outlet valve takes account of an existing hydraulic pressure in the wheel brake.

9. The method according to claim 1, wherein the adjusting of the outlet valve takes account of at least one feature of the roadway.

10. The method according to claim 9, wherein the at least one feature of the roadway includes a friction coefficient of the roadway.

11. The method according to claim 1, wherein the adjusting of the outlet valve takes account of at least one ambient condition, in particular an ambient temperature or humidity.

12. The method according to claim 11, wherein the at least one ambient condition includes an ambient temperature or humidity.

13. A hydraulic brake system of a motor vehicle comprising:
at least one wheel brake;
a normally open inlet valve configured to pass hydraulic fluid to the at least one wheel brake;
a normally closed outlet valve configured to discharge fluid from the at least one wheel brake; and
a control unit configured to build up pressure in the wheel brake by passing hydraulic fluid to the wheel brake via the inlet valve and to reduce pressure in the wheel brake by discharging hydraulic fluid from the wheel brake via energizing the outlet valve, the control unit configured to reduce the pressure at the wheel brake by adjusting the outlet valve in a predefined manner so as to change a pressure reduction gradient while the pressure is being reduced in the wheel brake.

* * * * *